US011735217B2

(12) United States Patent
Yuan et al.

(10) Patent No.: US 11,735,217 B2
(45) Date of Patent: Aug. 22, 2023

(54) HEAT ASSISTED MAGNETIC RECORDING MEDIA WITH AMORPHOUS MAGNETIC GRAIN BOUNDARY MATERIAL

(71) Applicant: Western Digital Technologies, Inc., San Jose, CA (US)

(72) Inventors: Hua Yuan, San Ramon, CA (US); Paul Christopher Dorsey, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 19 days.

(21) Appl. No.: 17/361,272

(22) Filed: Jun. 28, 2021

(65) Prior Publication Data
US 2021/0407543 A1 Dec. 30, 2021

Related U.S. Application Data

(60) Provisional application No. 63/045,771, filed on Jun. 29, 2020.

(51) Int. Cl.
| | | |
|---|---|---|
| G11B 5/66 | (2006.01) | |
| G11B 5/73 | (2006.01) | |
| H01F 1/047 | (2006.01) | |
| G11B 5/48 | (2006.01) | |
| G11B 5/00 | (2006.01) | |
| C22C 5/04 | (2006.01) | |

(52) U.S. Cl.
CPC ........ *G11B 5/73917* (2019.05); *G11B 5/4826* (2013.01); *H01F 1/047* (2013.01); *C22C 5/04* (2013.01); *C22C 2202/02* (2013.01); *G11B 2005/0021* (2013.01)

(58) Field of Classification Search
None
See application file for complete search history.

(56) References Cited

U.S. PATENT DOCUMENTS

| 7,592,081 B2 | 9/2009 | Gouke |
| 8,021,771 B2 | 9/2011 | Weller et al. |

(Continued)

OTHER PUBLICATIONS

Zhou, Bing et al., "The effect of adding magnetic oxide as grain boundary for HAMR"; Carnegie Mellon University; Last accessed Jun. 2020; https://arxiv.org/pdf/1804.07892.pdf; 11 pages.

(Continued)

*Primary Examiner* — William J Klimowicz
(74) *Attorney, Agent, or Firm* — Loza & Loza, LLP; Gabriel Fitch

(57) ABSTRACT

Aspects of the present disclosure provide a heat assisted magnetic recording HAMR media structure and methods for reducing the Curie temperature distribution to improve the signal-to-noise characteristics of HAMR media. A magnetic recording medium includes a substrate, a heat sink layer on the substrate, and a magnetic recording layer on the heat sink layer. The magnetic recording layer includes a plurality of magnetic recording grains configured for recording and comprising a first magnetic alloy. The magnetic recording layer further includes a plurality of segregants disposed to isolate the plurality of magnetic recording grains and comprising a second magnetic alloy. A Curie temperature of the second magnetic alloy is higher than a Curie temperature of the first magnetic alloy.

21 Claims, 11 Drawing Sheets

(56) References Cited

U.S. PATENT DOCUMENTS

| | | | |
|---|---|---|---|
| 8,488,276 | B1 | 7/2013 | Jung et al. |
| 8,565,050 | B1 | 10/2013 | Bertero et al. |
| 8,743,666 | B1* | 6/2014 | Bertero ............... G11B 5/66 |
| | | | 369/13.13 |
| 9,047,880 | B1 | 6/2015 | Bertero et al. |
| 9,443,544 | B1* | 9/2016 | Peng ................. G11B 5/667 |
| 9,601,144 | B1 | 3/2017 | Mehta et al. |
| 10,115,428 | B1* | 10/2018 | Bertero ............... G11B 5/314 |
| 10,276,201 | B1* | 4/2019 | Srinivasan ............ G11B 5/66 |
| 11,011,203 | B1* | 5/2021 | Chang ............... G11B 5/1278 |
| 11,437,064 | B1* | 9/2022 | Jubert ................ G11B 5/7375 |
| 2002/0034665 | A1* | 3/2002 | Nakazawa .......... G11B 5/8404 |
| | | | 428/843.2 |
| 2009/0130490 | A1* | 5/2009 | Dai ................... G11B 5/65 |
| | | | 428/800 |
| 2010/0182714 | A1 | 7/2010 | Kanbe et al. |
| 2013/0004796 | A1* | 1/2013 | Peng ................. G11B 5/7369 |
| | | | 428/800 |
| 2013/0071695 | A1 | 3/2013 | Peng et al. |
| 2014/0272473 | A1* | 9/2014 | Chen ................... G11B 5/65 |
| | | | 428/839.6 |
| 2014/0332496 | A1* | 11/2014 | Dai ................... G11B 5/65 |
| | | | 428/836 |
| 2016/0118071 | A1* | 4/2016 | Hirotsune ........... G11B 5/3133 |
| | | | 360/75 |
| 2016/0361417 | A1* | 12/2016 | Sutermeister ...... A61K 41/0052 |
| 2017/0025139 | A1* | 1/2017 | Jones ................ G11B 5/7264 |
| 2018/0047420 | A1 | 2/2018 | Srinivasan et al. |
| 2019/0287563 | A1* | 9/2019 | Kataoka ............... G11B 5/65 |
| 2022/0139422 | A1* | 5/2022 | Ho .................. G11B 5/73919 |
| | | | 428/831 |

OTHER PUBLICATIONS

Weller, Dieter et al., "Review Article: FePt heat assisted magnetic recording media"; Journal of Vacuum Science & Technology B 34(6); Oct. 26, 2016; https://avs.scitation.org/doi/10.1116/1.4965980; 11 pages.

Chen, J. S. et al., "Improvement of Recording Performance in FePt Perpendicular Media by Ag Pinning Layer"; IEEE Transactions on Magnetics; vol. 41, No. 10; Oct. 2005; https://ieeexplore.ieee.org/abstract/document/1519251; 3 pages.

* cited by examiner

HEAT ASSISTED MAGNETIC RECORDING MEDIA WITH AMORPHOUS MAGNETIC GRAIN BOUNDARY MATERIAL

CROSS-REFERENCE TO RELATED APPLICATIONS

This application claims priority to and the benefit of U.S. Provisional Patent Application No. 63/045,771 filed Jun. 29, 2020 and entitled, "HEAT ASSISTED MAGNETIC RECORDING MEDIA WITH AMORPHOUS MAGNETIC GRAIN BOUNDARY MATERIAL," the entire content of which is incorporated herein by reference.

INTRODUCTION

The present invention relates to heat assisted magnetic recording (HAMR) media, a method for fabricating the HAMR media, and a data storage apparatus using a HAMR medium.

Magnetic storage systems, such as a hard disk drive (HDD), are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disks. HAMR is a technique that can increase the areal density (AD) of written data on a magnetic storage medium having high coercivity. Furthermore, the AD can be increased by using smaller magnetic recording grains. However, using smaller magnetic recording grains may present challenges.

SUMMARY

Aspects of the present disclosure provide a heat assisted magnetic recording HAMR media structure and methods for reducing the Curie temperature distribution to improve the signal-to-noise characteristics of HAMR media.

One aspect of the present disclosure provides a magnetic recording medium for heat assisted magnetic recording (HAMR). The magnetic recording medium includes a substrate, a heat sink layer on the substrate, and a magnetic recording layer on the heat sink layer. The magnetic recording layer includes a plurality of magnetic recording grains configured for recording and comprising a first magnetic alloy. The magnetic recording layer further includes a plurality of segregants disposed to isolate the plurality of magnetic recording grains and comprising a second magnetic alloy. A Curie temperature of the second magnetic alloy is higher than a Curie temperature of the first magnetic alloy.

One aspect of the present disclosure provides a data storage device comprising the above-described magnetic recording medium.

One aspect of the present disclosure provides a method for fabricating a magnetic recording medium for heat assisted magnetic recording. The method provides a substrate, a heat sink layer on the substrate, and a magnetic recording layer on the heat sink layer. The magnetic recording layer includes a plurality of magnetic recording grains configured for recording and comprising a first magnetic alloy. The magnetic recording layer further includes a plurality of segregants disposed to isolate the plurality of magnetic recording grains and comprising a second magnetic alloy. A Curie temperature of the second magnetic alloy is higher than a Curie temperature of the first magnetic alloy.

DETAILED DESCRIPTION

Energy/Heat Assisted Magnetic Recording (EAMR/HAMR) systems can increase the areal density of information recorded magnetically on various magnetic media. In one example, a magnetic recording layer may include a FePt material (e.g., L10 ordered FePt alloys). A magnetic recording layer containing FePt may have a small grain size (e.g., less than 6 nm) and high anisotropy. However, FePt media is not easily writable with conventional recording heads.

HAMR techniques are often used to write data to FePt magnetic recording media. For a magnetic recording layer containing FePt, the Curie temperature $T_c$ of FePt grains decreases when the grain size is reduced. However, reducing the FePt grain size may result in a larger grain size distribution in the medium that could lead to a larger $T_c$ distribution.

Reducing grain size is a way for increasing the recording area density capability of magnetic recording media, for example, HAMR media. Recording characteristics, such as signal-to-noise ratio (SNR) characteristics, of HAMR media are highly dependent on the Curie temperature distribution (sigma $T_c$) of the HAMR media. Grain size distribution and ordering temperature distribution are exemplary causes of sigma $T_c$. As media grain size decreases, the contribution of these distributions on sigma $T_c$ will be stronger. Aspects of the present disclosure provide HAMR media and methods for reducing the Curie temperature distribution to improve SNR characteristics of magnetic recording media (e.g., HAMR media).

Figure 1:
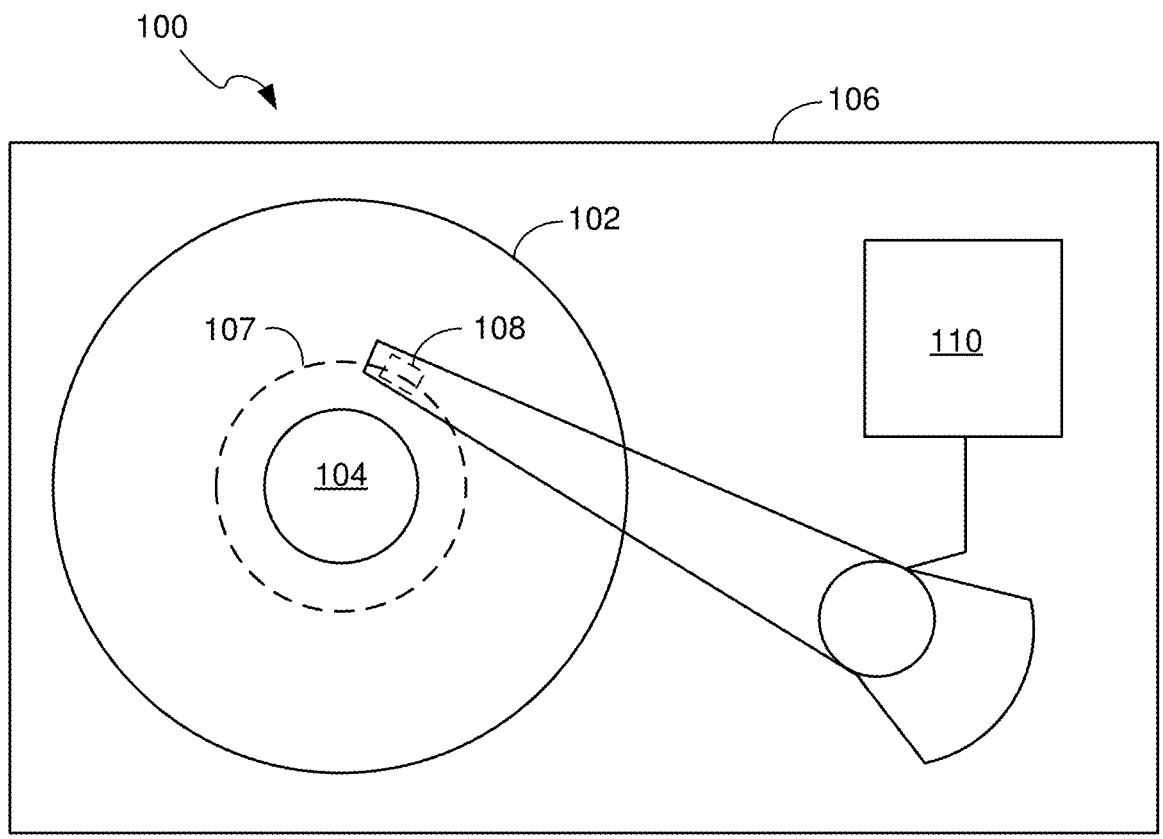
FIG. 1 is a diagram schematically illustrating a data storage device including a slider and a magnetic recording medium in accordance with one aspect of the disclosure.

FIG. 1 is a top schematic view of a data storage device 100 (e.g., disk drive or magnetic recording device) configured for heat assisted magnetic recording (HAMR) including a slider 108 and a magnetic recording medium 102 with a magnetic recording layer having magnetic segregants with a Curie temperature $T_c$ higher than that of the magnetic recording grains in accordance with one aspect of the disclosure. The laser (not visible in FIG. 1 but see 114 in FIG. 2) is positioned with a head/slider 108. Disk drive 100 may include one or more disks/media 102 to store data. Disk/media 102 resides on a spindle assembly 104 that is mounted to a drive housing 106. Data may be stored along tracks in the magnetic recording layer of disk 102. The reading and writing of data is accomplished with the head 108 (slider) that may have both read and write elements (108a and 108b). The write element 108 a is used to alter the properties of the magnetic recording layer of disk 102 and thereby write information thereto. In one embodiment, head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an example HAMR system is shown, the various embodiments described may be used in other EAMR or non-EAMR magnetic data recording systems, including perpendicular magnetic recording (PMR) disk drives or magnetic tape drives.

Figure 2:
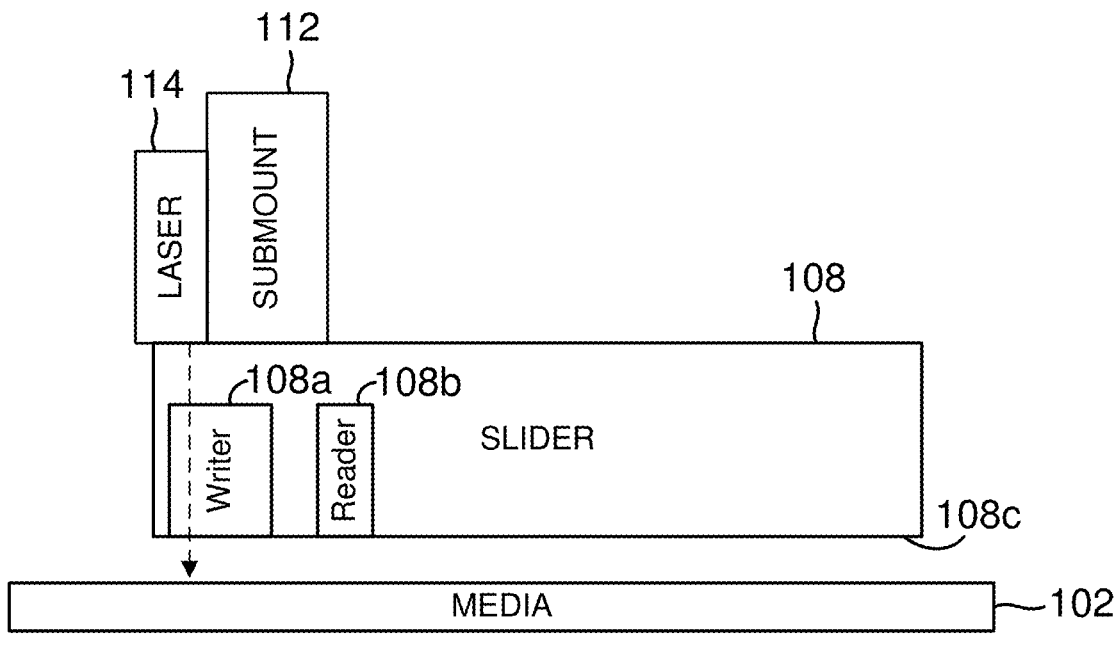
FIG. 2 is a side schematic view of the slider and magnetic recording medium of FIG. 1 in accordance with one aspect of the disclosure.

FIG. 2 is a side schematic view of the slider 108 and magnetic recording medium 102 of FIG. 1. The magnetic recording layer has amorphous magnetic segregants with a higher Curie temperature $T_c$ than that of the magnetic gains in accordance with one aspect of the disclosure. The slider 108 may include a sub-mount 112 attached to a top surface of the slider 108. The laser 114 may be attached to the sub-mount 112, and possibly to the slider 108. The slider 108 includes a write element (e.g., writer) 108a and a read element (e.g., reader) 108b positioned along an air bearing surface (ABS) 108c of the slider for writing information to, and reading information from, respectively, the media 102. In other aspects, the slider may also comprise a layer of the lubricant (not shown).

In operation, the laser 114 is configured to generate and direct light energy to a waveguide (e.g., along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the media 102 within or near the write element 108a, and near the read element 108b. In the embodiment illustrated in FIG. 2, the laser directed light is disposed within the writer 108a and near a trailing edge of the slider. In other embodiments, the laser directed light may instead be positioned between the writer 108a and the reader 108b. FIGS. 1 and 2 illustrate a specific embodiment of a HAMR system. In other embodiments, the magnetic recording medium 102 with the magnetic recording layer having amorphous magnetic segregants can be used in other suitable HAMR systems (e.g., with other sliders configured for HAMR).

Figure 3:
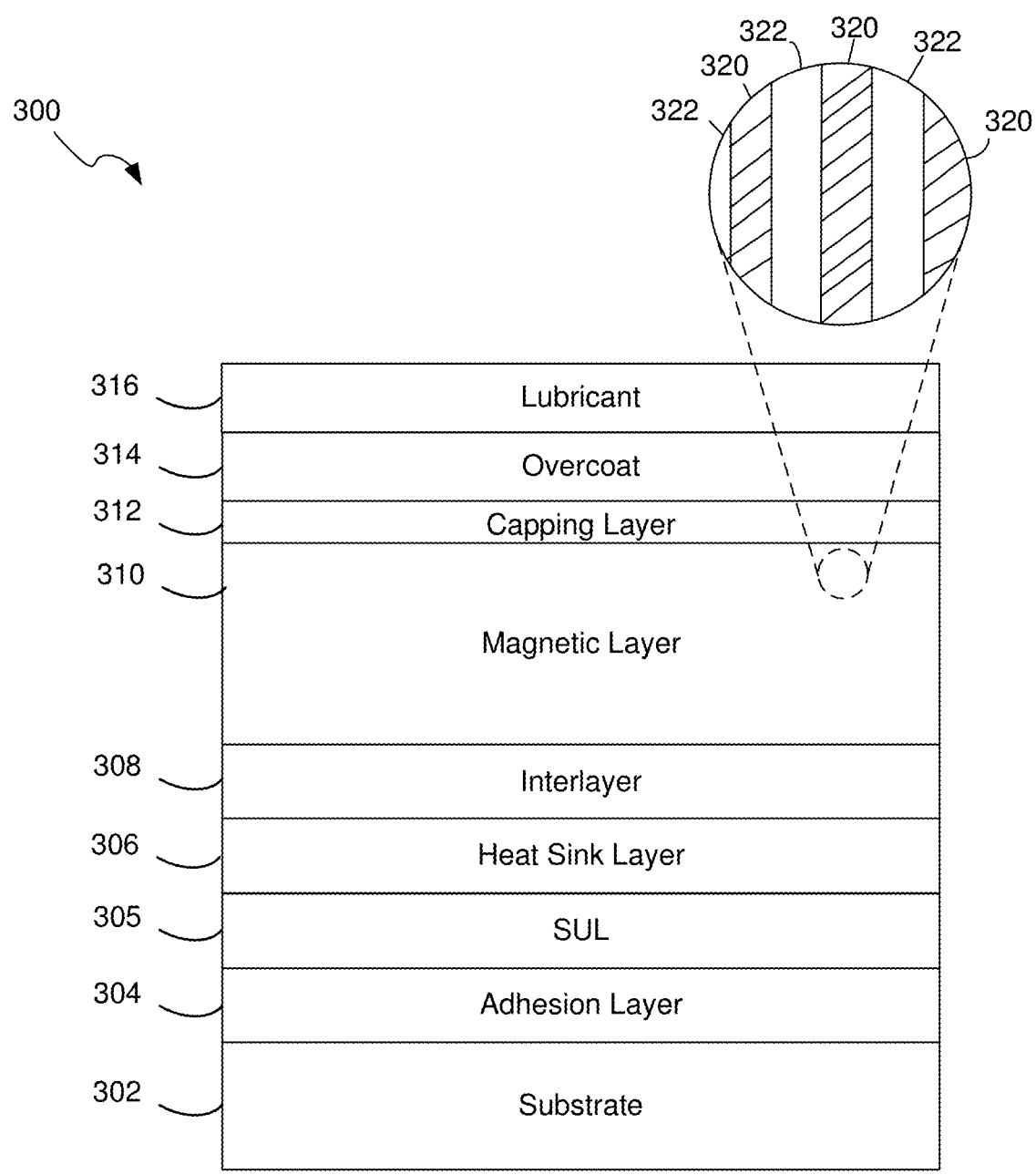
FIG. 3 is a side schematic view of a head assisted magnetic recording (HAMR) medium in accordance with one aspect of the disclosure.

FIG. 3 is a side schematic view of a magnetic recording medium 300 with a magnetic recording layer having an improved Curie temperature distribution and SNR in accordance with one aspect of the disclosure. In one aspect, the magnetic recording medium 300 may be used in a HAMR system (e.g., disk drive 100). The magnetic recording medium 300 has a stacked structure with a substrate 302 at a bottom/base layer, an adhesion layer 304 on the substrate 302, a heat sink layer 306 on the adhesion layer 304, an interlayer 308 on the heat sink layer 306, a magnetic recording layer (MRL) 310 on the interlayer 308, a capping layer 312 on the MRL 310, an overcoat layer 314 on the capping layer 312, and a lubricant layer 316 on the overcoat layer 314. In one embodiment, the magnetic recording medium 300 may have a soft magnetic underlayer (SUL) 305 between the adhesion layer 304 and the heat sink layer 306. In one embodiment, the magnetic recording medium 300 may have a thermal resistance layer (TRL) between the interlayer 308 and the heat sink layer 306. In one embodiment, the substrate 302 can be made of one or more materials such as an Al alloy, NiP plated Al, glass, glass ceramic, and/or combinations thereof. In some embodiments, the magnetic recording medium 300 may have some or all of the layers illustrated in FIG. 3 and/or additional layer(s) in various stacking orders.

In some embodiments, the MRL 310 may include one or more magnetic recording layers in a preselected stacking order (e.g., a magnetic recording layer structure). The MRL 310 may include magnetic grains 320 and amorphous magnetic segregants 322 providing isolation of the magnetic grains. In one aspect, the isolation of the magnetic recording grains is provided where the lateral sides of each grain are adjacent to the segregants. In one aspect, the segregant and grains form an alternating pattern along a horizontal direction across MRL 310. In one embodiment, the amorphous magnetic segregants are ferromagnetic and have a higher intrinsic Curie temperature than that of the magnetic grains to assist the magnetization switching of the magnetic grains. In one embodiment, the magnetic grains may include a magnetic alloy, for example, FePt. In one embodiment, the amorphous magnetic segregants may include a magnetic alloy, for example, Fe2B (iron boride). In several embodiments, the magnetic alloy has a higher intrinsic Curie temperature than that of the magnetic grains to assist the magnetization switching of the magnetic grains.

Figure 4A:
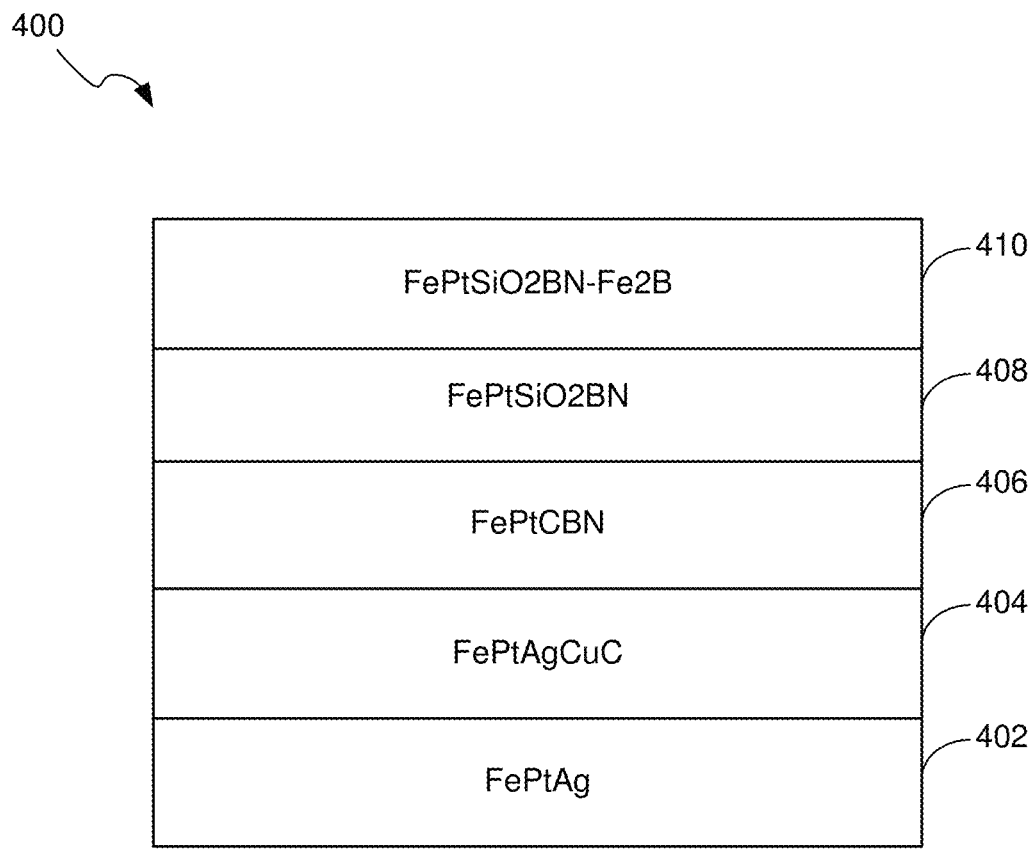
FIG. 4a is a side schematic view of a first multi-layer magnetic recording layer structure in accordance with one aspect of the disclosure.

FIG. 4a is a side schematic view of a first multi-layer MRL structure 400 in accordance with one embodiment. In one example, the first multi-layer MRL structure 400 may be used for the MRL 310 in the embodiment of FIG. 3. The first multi-layer MRL structure 400 can be fabricated by depositing a plurality of magnetic layers, for example, a first magnetic layer (ML) 402, a second ML 404 on the first ML 402, a third ML 406 on the second ML 404, a fourth ML 408 on the third ML 406, and a fifth ML 410 on the fourth ML 408. The deposited magnetic layers work together to record data. In some embodiments, the MRL 310 may include more or fewer magnetic layers than the embodiment illustrated in FIG. 4a. In some embodiments, one or more of the magnetic layers may contain different materials, for example, different magnetic alloys or grains. In the embodiment illustrated in FIG. 4a, the first ML 402 is made of a first magnetic alloy (e.g., FePtAg), the second ML 404 is made of a second magnetic alloy (e.g., FePtAgCuC), the third ML 406 is made of a third magnetic alloy (e.g., FePtCBN), the fourth ML 408 is made of a fourth magnetic alloy (e.g., FePtSiO2BN), and the fifth ML 410 is made of a fifth magnetic alloy (e.g., FePtSiO2BN). The magnetic grains of the different MLs may mix together during deposition. In some embodiments, one of the MLs may contain at least one material that is not contained in at least one of the other MLs. In some embodiments, one or more of the MLs may contain amorphous magnetic segregants that have a higher Curie temperature than that of the magnetic recording grains. One or more of the MLs may contain non-magnetic segregants (e.g., C, BN, oxide, etc.) with or without the amorphous magnetic segregants (e.g., Fe2B). In the embodiment illustrated in FIG. 4a, ML 410 contains the amorphous magnetic segregants (e.g., Fe2B). In other embodiments, the amorphous magnetic segregants can instead be used in any of the other MLs, or they can be used in multiple MLs.

In one embodiment, such as the one illustrated in FIG. 4a, one or more of the MLs 402, 404, 406, 408, and 410 may be made of an alloy selected from FePtX, where X is a material selected from Ag, Cu, C, B, N, SiO2, and combinations thereof. In another embodiment, one or more of the MLs may be made of CoPtX instead of FePtX. In one embodiment, the fourth ML 408 and fifth ML 410 may be considered as sublayers of a magnetic recording layer.

In one aspect, in the first magnetic alloy (e.g., FePtAg) of the first ML 402, the FePt can form a magnetic grain and the Ag can act as a segregant. In one aspect, in the second magnetic alloy (e.g., FePtAgCuC) of the second ML 404, the FeCuPt can form a magnetic grain and the AgC can act as a segregant. In one aspect, in the third magnetic alloy (e.g., FePtCBN) of the third ML 406, the FePt can form a magnetic grain and the CBN can act as a segregant. In one aspect, in the fourth magnetic alloy (e.g., FePtSiO2BN) of the fourth ML 408, the FePt can form a magnetic grain and the SiO2BN can act as a segregant.

In one embodiment, the second ML 404 has a greater thickness than the first ML 402, the third ML 406 has a greater thickness than the second ML 404, and the total thickness of fourth and fifth MLs 408 and 410 is greater than the thickness of the third ML 406. In one embodiment, the first ML 402 may have a thickness of about 0.5 nm, the second ML 404 may have a thickness of about 1 nm, the third ML 406 may have a thickness of about 2 nm, and the fourth and fifth MLs 408 and 410 may have a combined thickness between about 5 nm and about 6 nm.

In several embodiments, one or more of the above described magnetic recording layers (MLs 402, 404, 406, 408, and 410) may include magnetic grains segregated by amorphous magnetic segregants. In one embodiment, the amorphous magnetic segregants (e.g., Fe2B) have a higher intrinsic Curie temperature than that of the magnetic grains (e.g., FePt magnetic gains) of the MLs. The amorphous magnetic segregants (e.g., Fe2B) can be positioned to isolate each of the magnetic grains (e.g., FePt or FePtSiO2BN) in HAMR media. At writing temperature of the magnetic recording layer, the amorphous magnetic segregants can assist the magnetization switching of the magnetic grains (e.g., FePt or FePtSiO2BN grains). Stated another way, the use of amorphous magnetic segregants can have the effect of increasing the effective size of the magnetic grains. Therefore, the amorphous magnetic segregants can reduce the Curie temperature distribution (sigma $T_c$) and improve SNR of the magnetic recording layer.

In one embodiment, the amorphous magnetic segregants may include a magnetic alloy, for example, Fe2B (iron boride). In one embodiment, during recording, moment of the FePt magnetic grains is very small. Using the amorphous magnetic segregants (e.g., made of Fe2B) with high $T_c$ at the grain boundary of a FePt recording layer can have the effect of assisting FePt switching at high temperature with Zeeman energy. In one embodiment, the Curie temperature of amorphous magnetic segregants made of Fe2B can be higher than 1000 Kelvin (K) (e.g., about 1015 K or 1043 K) that is higher than the Curie temperature (e.g., 750 K) of the magnetic grains made of a FePt based alloy. In one embodiment, the magnetic grains may be made of a CoPt based alloy (e.g., Co50Pt50). For example, Co50Pt50 has a Curie temperature about 100 degrees higher (e.g., 850 K) than that of the Fe50Pt50. In some embodiments, the amorphous magnetic segregants may be made of Fe2B, Fe2O3 (Tc of about 948 K), Fe3O4 (Tc of about 858K), and/or NiO—Fe2O3 (Tc of about 858K), where each has a Curie temperature higher than that of the magnetic grains. In one embodiment, the Curie temperature of the amorphous magnetic segregants is at least 1000 K, or 200 K higher than that of the magnetic grains. The percentages of constituents listed here (e.g., 50 percent) are in atomic percent unless specified otherwise.

In several embodiments, the MLs 402, 404, 406, 408, and 410 described above operate collectively (e.g., effectively operate as a single magnetic recording layer) to enable information to be recorded to the multi-layer magnetic recording layer 310. For example, in one embodiment, one bit of information may collectively be stored within one grain from each magnetic recording layer, where the grains are positioned at roughly the same horizontal position along the layers and may collectively act like a single vertically oriented grain extending through all the layers. This can be the case even if the grains on each magnetic recording layers are physically distinct based on having different materials. In other embodiments, the one single grain may be replaced by multiple grains on any given layer to store the single bit of information.

Figure 4B:
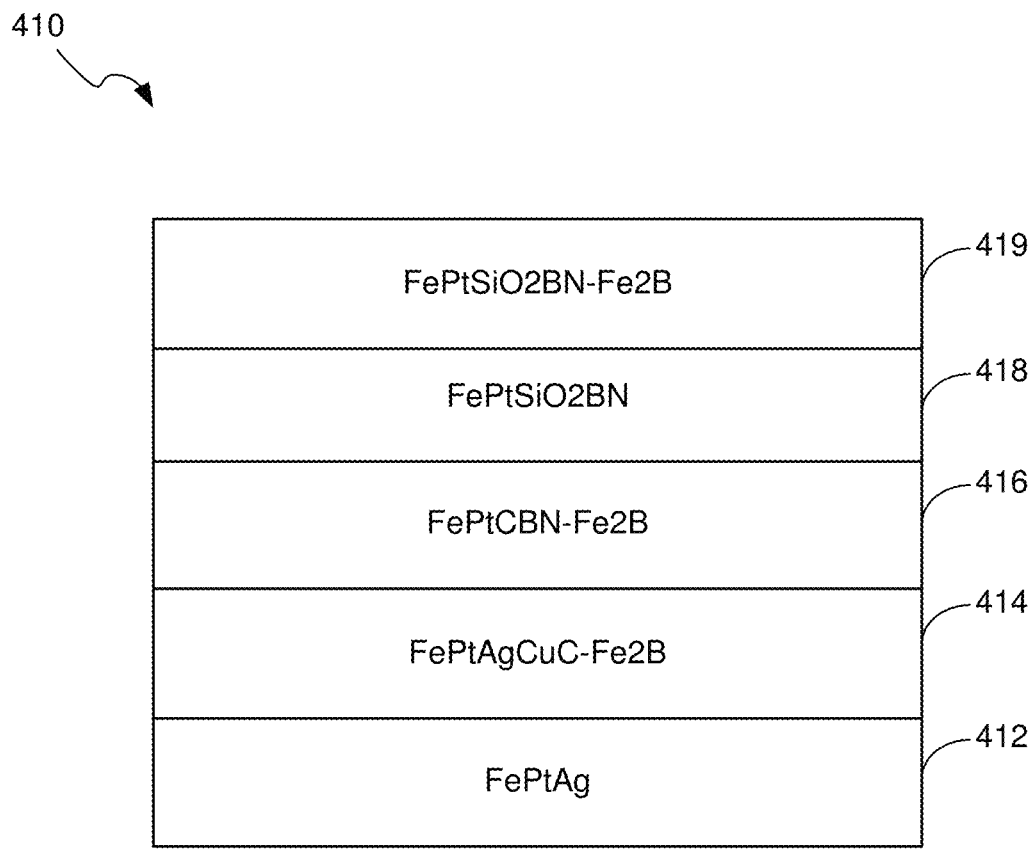
FIG. 4b is a side schematic view of a second multi-layer magnetic recording layer structure in accordance with one aspect of the disclosure.

FIG. 4b is a side schematic view of a second multi-layer MRL structure 410 in accordance with one embodiment. In one example, the second multi-layer MRL structure 410 may be used for the MRL 310 in the embodiment of FIG. 3. The second multi-layer MRL structure 410 can be fabricated by depositing a plurality of magnetic layers, for example, a first magnetic layer (ML) 412, a second ML 414 on the first ML 412, a third ML 416 on the second ML 414, a fourth ML 418 on the third ML 416, and a fifth ML 419 on the fourth ML 418. The deposited magnetic layers work together to record data. In some embodiments, one or more of the magnetic layers may contain different materials, for example, different magnetic alloys or grains. In the embodiment illustrated in FIG. 4b, the first ML 412 is made of a first magnetic alloy (e.g., FePtAg), the second ML 414 is made of a second magnetic alloy (e.g., FePtAgCuC), the third ML 416 is made of a third magnetic alloy and an amorphous magnetic segregant (e.g., FePtCBN—Fe2B), the fourth ML 418 is made of a fourth magnetic alloy and an amorphous magnetic segregant (e.g., FePtSiO2BN—Fe2B), and the fifth ML 410 is made of a fifth magnetic alloy (e.g., FePtSiO2BN). The magnetic grains of the different MLs may mix together during deposition.

In one embodiment, such as the one illustrated in FIG. 4*b*, one or more of the MLs 412, 414, 416, 418, and 419 may be made of an alloy selected from FePtX, where X is a material selected from Ag, Cu, C, B, N, SiO2, and combinations thereof. In another embodiment, one or more of the MLs may be made of CoPtX instead of FePtX. In one embodiment, the fourth ML 418 and fifth ML 419 may be considered as sublayers of a magnetic recording layer.

The second multi-layer MRL structure 410 is similar to the first multi-layer MRL structure 400 described above in relation to FIG. 4*a*; therefore, only the differences between the first multi-layer MRL structure 400 and the second multi-layer MRL structure 410 will be described herein. In several embodiments, one or more of the above described magnetic recording layers (e.g., MLs 414, 416, and/or 419 such as in FIG. 4*b*) may include magnetic grains segregated by amorphous magnetic segregants (e.g., Fe2B). The amorphous magnetic segregants (e.g., Fe2B) can be positioned to isolate each of the magnetic grains in HAMR media. In one embodiment, the amorphous magnetic segregants may include a magnetic alloy, for example, Fe2B.

Figure 4C:
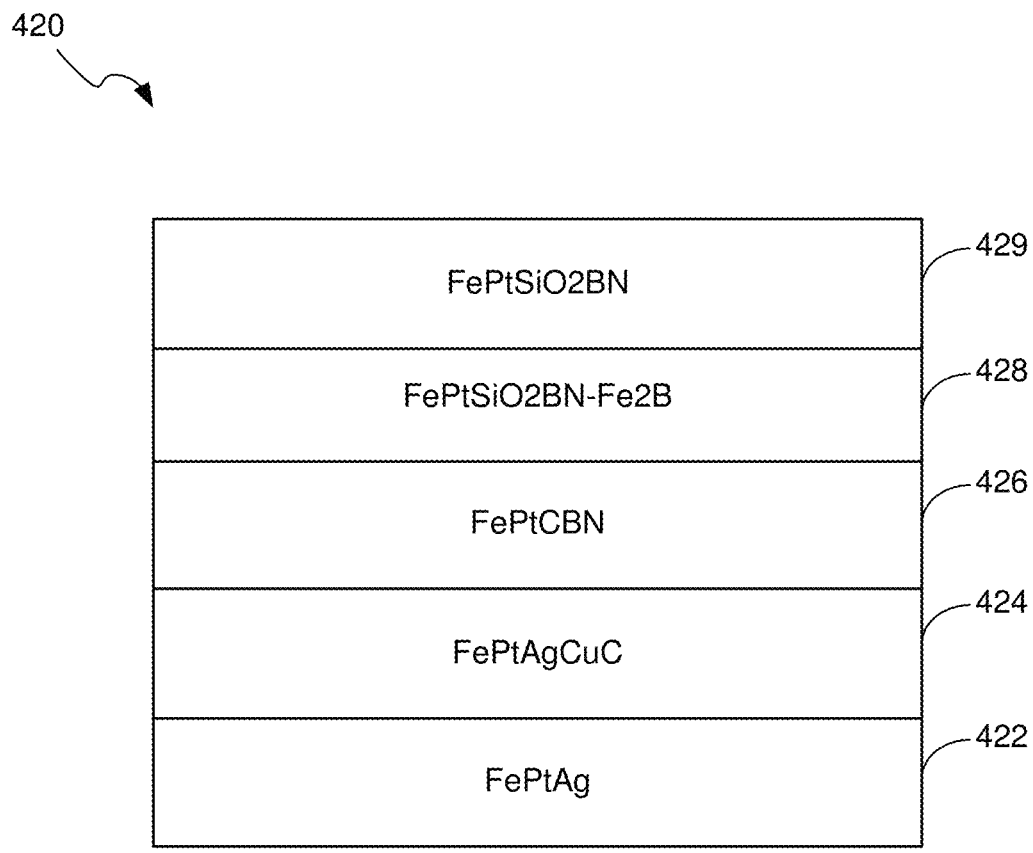
FIG. 4c is a side schematic view of a third multi-layer magnetic recording layer structure in accordance with one aspect of the disclosure.

FIG. 4*c* is a side schematic view of a third multi-layer MRL structure 420 in accordance with one embodiment. In one example, the third multi-layer MRL structure 420 may be used for the MRL 310 in the embodiment of FIG. 3. The third multi-layer MRL structure 420 can be fabricated by depositing a plurality of magnetic layers, for example, a first ML 422, a second ML 424 on the first ML 422, a third ML 426 on the second ML 424, a fourth ML 428 on the third ML 426, and a fifth ML 429 on the fourth ML 428. The deposited magnetic layers work together to record data. In some embodiments, one or more of the magnetic layers may contain different materials, for example, different magnetic alloys or grains. In the embodiment illustrated in FIG. 4*c*, the first ML 422 is made of a first magnetic alloy (e.g., FePtAg), the second ML 424 is made of a second magnetic alloy (e.g., FePtAgCuC), the third ML 426 is made of a third magnetic alloy (e.g., FePtCBN), the fourth ML 428 is made of a fourth magnetic alloy and an amorphous magnetic segregant (e.g., FePtSiO2BN—Fe2B), and the fifth ML 429 is made of a fifth magnetic alloy (e.g., FePtSiO2BN). The magnetic grains of the different MLs may mix together during deposition.

In one embodiment, such as the one illustrated in FIG. 4*c*, one or more of the MLs 422, 424, 426, 428, and 429 may be made of an alloy selected from FePtX, where X is a material selected from Ag, Cu, C, B, N, SiO2, and combinations thereof. In another embodiment, one or more of the MLs may be made of CoPtX instead of FePtX. In one embodiment, the fourth ML 428 and fifth ML 429 may be considered as sublayers of a magnetic recording layer.

The third multi-layer MRL structure 420 is similar to the first multi-layer MRL structure 400 described above in relation to FIG. 4*a*; therefore, only the differences between the first multi-layer MRL structure 400 and the third multi-layer MRL structure 420 will be described herein. In several embodiments, one or more of the above described magnetic recording layers (e.g., ML 428 as shown in FIG. 4*c*) may include magnetic grains segregated by amorphous magnetic segregants (e.g., Fe2B). The amorphous magnetic segregants (e.g., Fe2B) can be positioned to isolate each of the magnetic grains in HAMR media. In one embodiment, the amorphous magnetic segregants may include a magnetic alloy, for example, Fe2B.

Figure 4D:
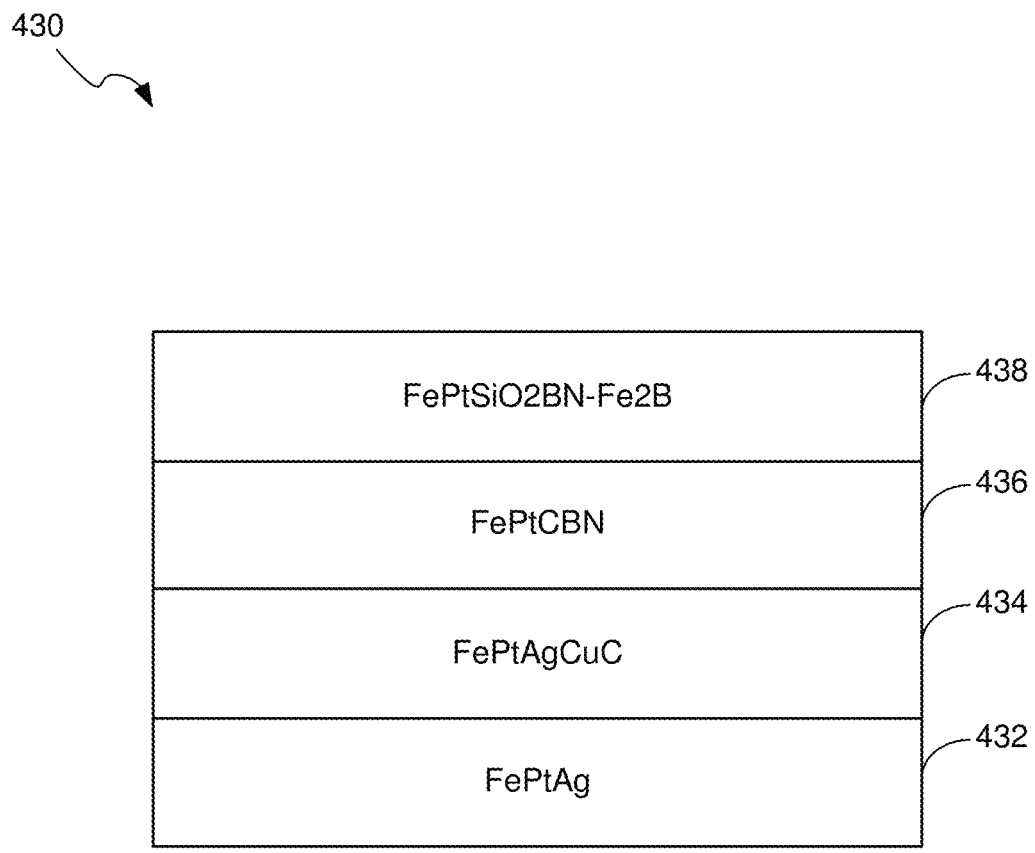
FIG. 4d is a side schematic view of a fourth multi-layer magnetic recording layer structure in accordance with one aspect of the disclosure.

FIG. 4*d* is a side schematic view of a fourth multi-layer MRL structure 430 in accordance with one embodiment. In one example, the fourth multi-layer MRL 430 may be used as the MRL 310 in the embodiment of FIG. 3. The fourth multi-layer MRL 430 can be fabricated by depositing a plurality of magnetic layers, for example, a first ML 432, a second ML 434 on the first ML 432, a third ML 436 on the second ML 434, and a fourth ML 438 on the third ML 436. The deposited magnetic layers work together to record data. In some embodiments, one or more of the magnetic layers may contain different materials, for example, different magnetic alloys or grains. In the embodiment illustrated in FIG. 4*d*, the first ML 432 may contain a first magnetic alloy (e.g., FePtAg), the second ML 434 may contain a second magnetic alloy (e.g., FePtAgCuC), the third ML 436 may contain a third magnetic alloy (e.g., FePtCBN), and the fourth ML 438 may contain a fourth magnetic alloy and an amorphous magnetic segregant (e.g., FePtSiO2BN—Fe2B). The magnetic grains of the different MLs may mix together during deposition. In one embodiment, such as the one illustrated in FIG. 4*d*, one or more of the MLs 432, 434, 436, and 438 may be made of an alloy selected from FePtX, where X is a material selected from Ag, Cu, C, B, N, SiO2, and combinations thereof. In another embodiment, one or more of the MLs may be made of CoPtX instead of FePtX.

The fourth multi-layer MRL 430 is similar to the first multi-layer MRL 400 described above in relation to FIG. 4*a*; therefore, only the differences between the first multi-layer MRL 400 and the fourth multi-layer MRL 430 will be described herein. In several embodiments, one or more of the above described magnetic recording layers (e.g., MLs 438 as shown in FIG. 4*d*) may include magnetic grains segregated by amorphous magnetic segregants (e.g., Fe2B). The amorphous magnetic segregants (e.g., Fe2B) can be positioned to isolate each of the magnetic grains in HAMR media. In one embodiment, the amorphous magnetic segregants may include a magnetic alloy, for example, Fe2B.

Figure 4E:
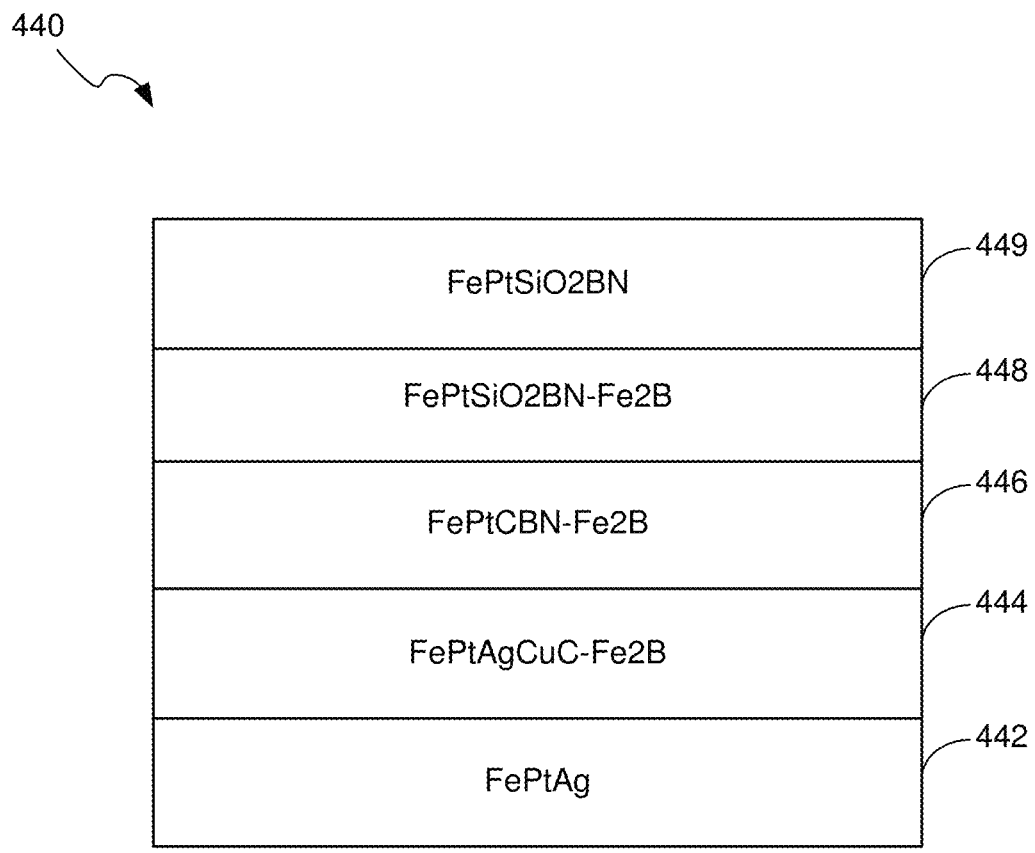
FIG. 4e is a side schematic view of a fifth multi-layer magnetic recording layer structure in accordance with one aspect of the disclosure.

FIG. 4*e* is a side schematic view of a fifth multi-layer MRL structure 440 in accordance with one embodiment. In one example, the fifth multi-layer MRL structure 440 may be used for the MRL 310 in the embodiment of FIG. 3. The fifth multi-layer MRL structure 440 can be fabricated by depositing a plurality of magnetic layers, for example, a first ML 442, a second ML 444 on the first ML 442, a third ML 446 on the second ML 444, a fourth ML 448 on the third ML 446, and a fifth ML 449 on the fourth ML 448. The deposited magnetic layers work together to record data. In some embodiments, one or more of the magnetic layers may contain different materials, for example, different magnetic alloys or grains. In the embodiment illustrated in FIG. 4*e*, the first ML 442 is made of a first magnetic alloy (e.g., FePtAg), the second ML 444 is made of a second magnetic alloy and an amorphous magnetic segregant (e.g., FePtAgCuC—Fe2B), the third ML 446 is made of a third magnetic alloy and an amorphous magnetic segregant (e.g., FePtCBN—Fe2B), the fourth ML 448 is made of a fourth magnetic alloy and an amorphous magnetic segregant (e.g., FePtSiO2BN—Fe2B), and the fifth ML 429 is made of a fifth magnetic alloy (e.g., FePtSiO2BN). The magnetic grains of the different MLs may mix together during deposition.

In one embodiment, such as the one illustrated in FIG. 4*e*, one or more of the MLs 442, 444, 446, 448, and 449 may be made of an alloy selected from FePtX, where X is a material selected from Ag, Cu, C, B, N, SiO2, and combinations thereof. In another embodiment, one or more of the MLs may be made of CoPtX instead of FePtX. In one embodiment, the fourth ML 428 and fifth ML 429 may be considered as sublayers of a magnetic recording layer.

The fifth multi-layer MRL structure 440 is similar to the first multi-layer MRL structure 400 described above in relation to FIG. 4a; therefore, only the differences between the first multi-layer MRL structure 400 and the fifth multi-layer MRL structure 440 will be described herein. In several embodiments, one or more of the above described magnetic recording layers (e.g., MLs 444, 446, and 428 as shown in FIG. 4c) may include magnetic grains segregated by amorphous magnetic segregants (e.g., Fe2B). The amorphous magnetic segregants (e.g., Fe2B) can be positioned to isolate each of the magnetic grains in HAMR media. In one embodiment, the amorphous magnetic segregants may include a magnetic alloy, for example, Fe2B.

Figure 4F:
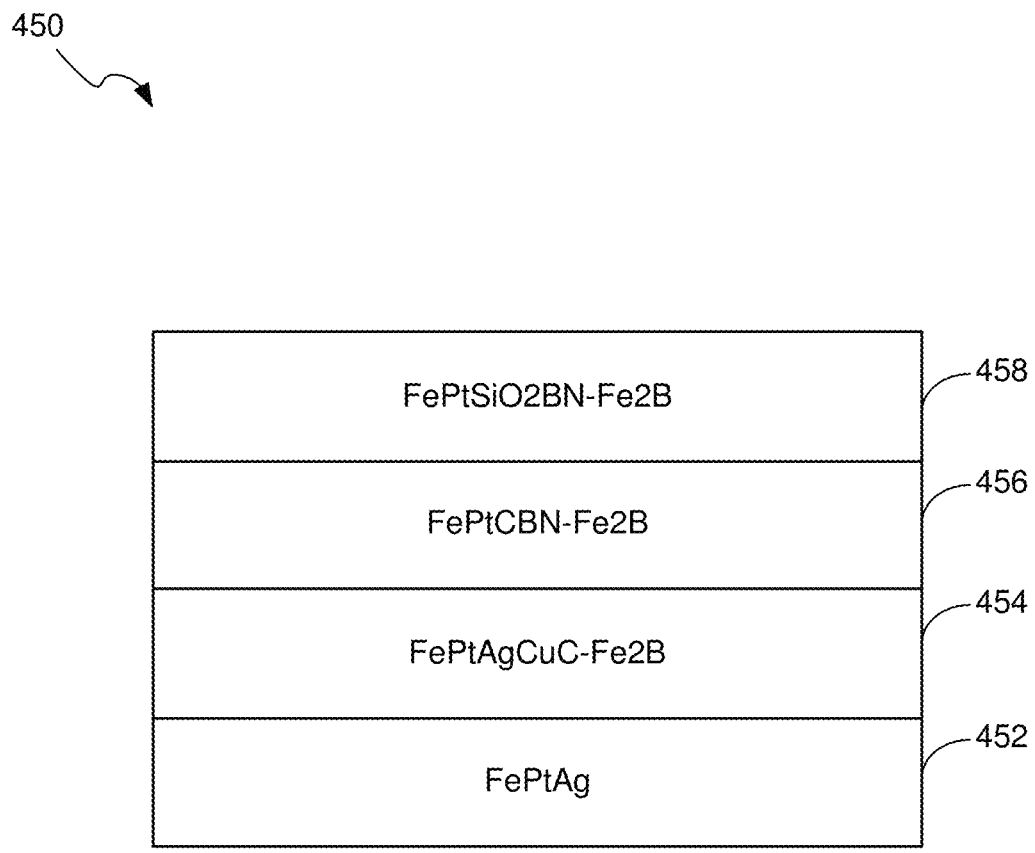
FIG. 4f is a side schematic view of a sixth multi-layer magnetic recording layer structure in accordance with one aspect of the disclosure.

FIG. 4f is a side schematic view of a sixth multi-layer MRL structure 450 in accordance with one embodiment. In one example, the sixth multi-layer MRL 450 may be used as the MRL 310 in the embodiment of FIG. 3. The sixth multi-layer MRL 450 can be fabricated by depositing a plurality of magnetic layers, for example, a first ML 452, a second ML 454 on the first ML 452, a third ML 456 on the second ML 454, and a fourth ML 458 on the third ML 456. The deposited magnetic layers work together to record data. In some embodiments, one or more of the magnetic layers may contain different materials, for example, different magnetic alloys or grains. In the embodiment illustrated in FIG. 4f, the first ML 452 may contain a first magnetic alloy (e.g., FePtAg), the second ML 454 may contain a second magnetic alloy and an amorphous magnetic segregant (e.g., FePtAg-CuC—Fe2B), the third ML 456 may contain a third magnetic alloy and an amorphous magnetic segregant (e.g., FePtCBN—Fe2B), and the fourth ML 458 may contain a fourth magnetic alloy and an amorphous magnetic segregant (e.g., FePtSiO2BN—Fe2B). The magnetic grains of the different MLs may mix together during deposition. In one embodiment, such as the one illustrated in FIG. 4f, one or more of the MLs 452, 454, 456, and 458 may be made of an alloy selected from FePtX, where X is a material selected from Ag, Cu, C, B, N, SiO2, and combinations thereof. In another embodiment, one or more of the MLs may be made of CoPtX instead of FePtX.

The sixth multi-layer MRL 450 is similar to the first multi-layer MRL 400 described above in relation to FIG. 4a; therefore, only the differences between the first multi-layer MRL 400 and the sixth multi-layer MRL 450 will be described herein. In several embodiments, one or more of the above described magnetic recording layers (e.g., MLs 454, 456, 438 as shown in FIG. 4f) may include magnetic grains segregated by amorphous magnetic segregants (e.g., Fe2B). The amorphous magnetic segregants (e.g., Fe2B) can be positioned to isolate each of the magnetic grains in HAMR media. In one embodiment, the amorphous magnetic segregants may include a magnetic alloy, for example, Fe2B.

Figure 5:
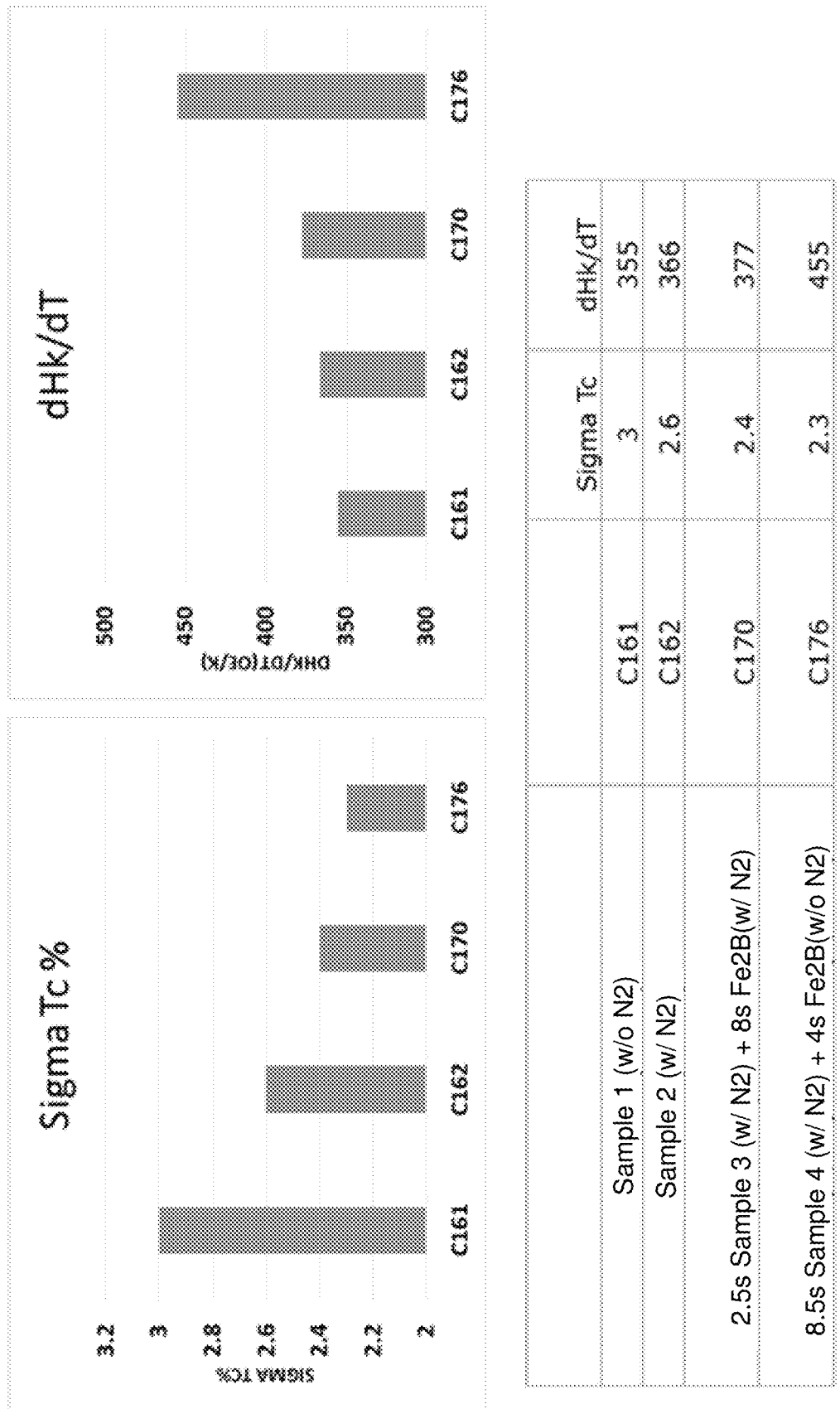
FIG. 5 are graphs of Curie temperature distribution (sigma Tc) and anisotropy field gradient (dHk/dT) of exemplary HAMR media.

FIG. 5 are graphs of Curie temperature distribution (sigma $T_c$) and anisotropy field gradient (dHk/dT) of some exemplary HAMR media. Data of four HAMR media C161, C162, C170, and C176 are compared in FIG. 5. HAMR media C170 and C176 are exemplary FePt based magnetic recording media including amorphous magnetic segregants (e.g., Fe2B) to reduce the sigma $T_e$ of the media in accordance with some embodiments. HAMR media C161 and C162 are comparative FePt based magnetic recording media without amorphous magnetic segregants. Testing results of these magnetic media show that the sigma $T_c$ and dHk/dT of the media (C170 and C176) with amorphous magnetic segregants have about 11.5% reduction in sigma $T_c$ and about 24% increase in dHk/dT compared to the comparative media C161 and C162.

In some aspects, varying the sputtering duration for forming the media with or without using nitrogen can change the sigma $T_c$ and dHk/dT. For example, as shown in FIG. 5, the HAMR medium C170 is fabricated by sputtering a target including materials for the magnetic grains for 2.5 seconds and then sputtering a target including materials for the Fe2B segregants for 8 seconds. In another example, as shown in FIG. 5, the HAMR medium C176 is fabricated by sputtering the target including materials for the magnetic grains for 8.5 seconds and then sputtering the target including materials for the Fe2B segregants for 4 seconds. In some examples, these sputtering durations can be modified. For example, other sputtering durations (e.g., between 0 and 10 seconds) may be used to obtain the desired amount (volume percent) of Fe2B segregants, or to obtain the desired amount of materials for the magnetic grains (e.g., FePt, possibly combined with non-magnetic segregants), in the HAMR medium. Thus, optimization of deposition parameters such as the use or non-use of nitrogen and the sputter duration of both grain materials and segregant materials can be used to achieve a desired/improved sigma $T_c$. The improved sigma $T_c$ and dHk/dT of the HAMR media C170 and C176 lead to improved SNR characteristic of the HAMR media. In one example, spinstand recording data of exemplary HAMR media with Fe2B segregants has 0.4 dB increase in wsSNRinit/wsSNRfinal, 0.17 nm reduction in jitter, 0.2 dB increase in eSNRwrfinal, and 1.1 dB increase in eSNRrd final, when compared with the control media without changing grain size and structural property of the FePt based magnetic grains.

Figure 6:
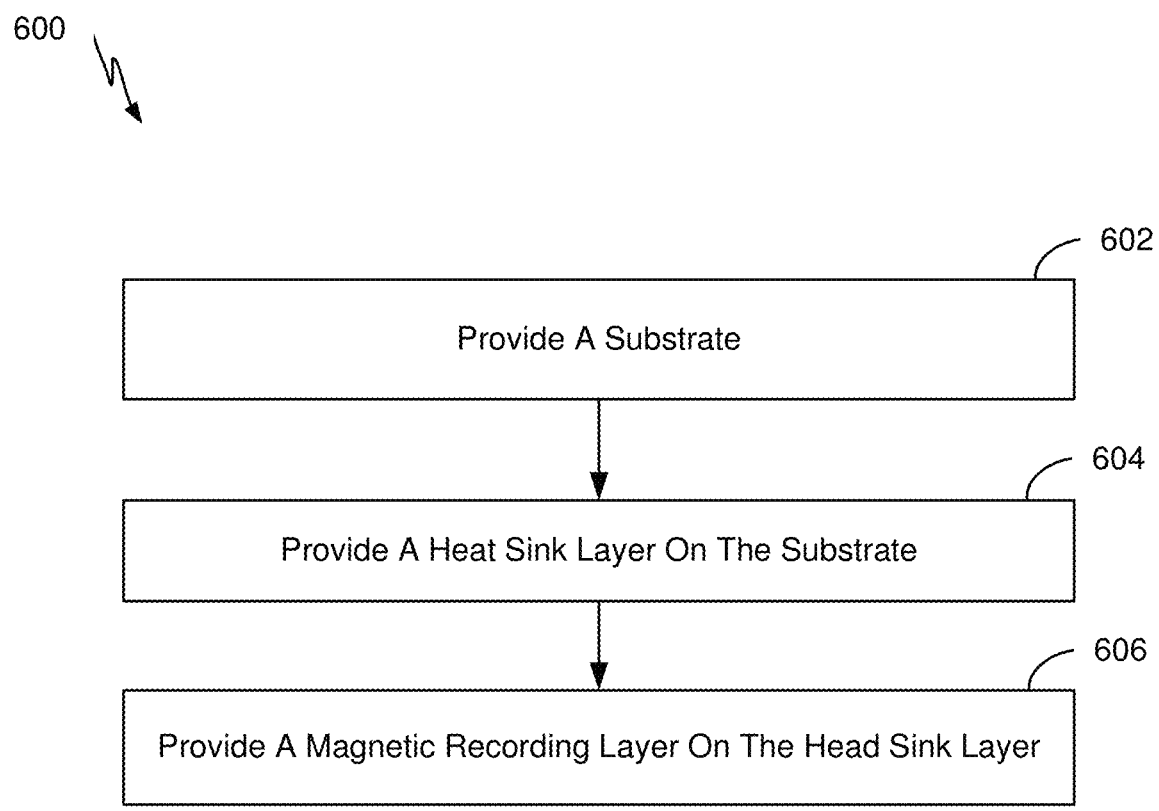
FIG. 6 is a flowchart of a process for fabricating a HAMR medium with a magnetic recording layer having an amorphous magnetic segregation material in accordance with one aspect of the disclosure.

FIG. 6 is a flowchart of a process 600 for fabricating a HAMR medium with a magnetic recording layer having amorphous magnetic segregants in accordance with one aspect of the disclosure. In one embodiment, the process 600 can be used to fabricate the HAMR medium described above in relation to FIGS. 3 and 4 or any magnetic recording media. At block 602, the process provides a substrate. For example, the substrate may be the substrate 302 of FIG. 3. At block 604, the process provides heat sink layer on the substrate. For example, the heatsink layer may be the heatsink layer 306 of FIG. 3. At block 606, the process provides a multi-layer magnetic recording layer (MRL) on the heatsink layer. For example, the MRL may be the MRL 310 of FIG. 3. The MRL includes amorphous magnetic or ferromagnetic segregants with a Curie temperature higher than that of the MRL or magnetic recording grains.

Figure 7:
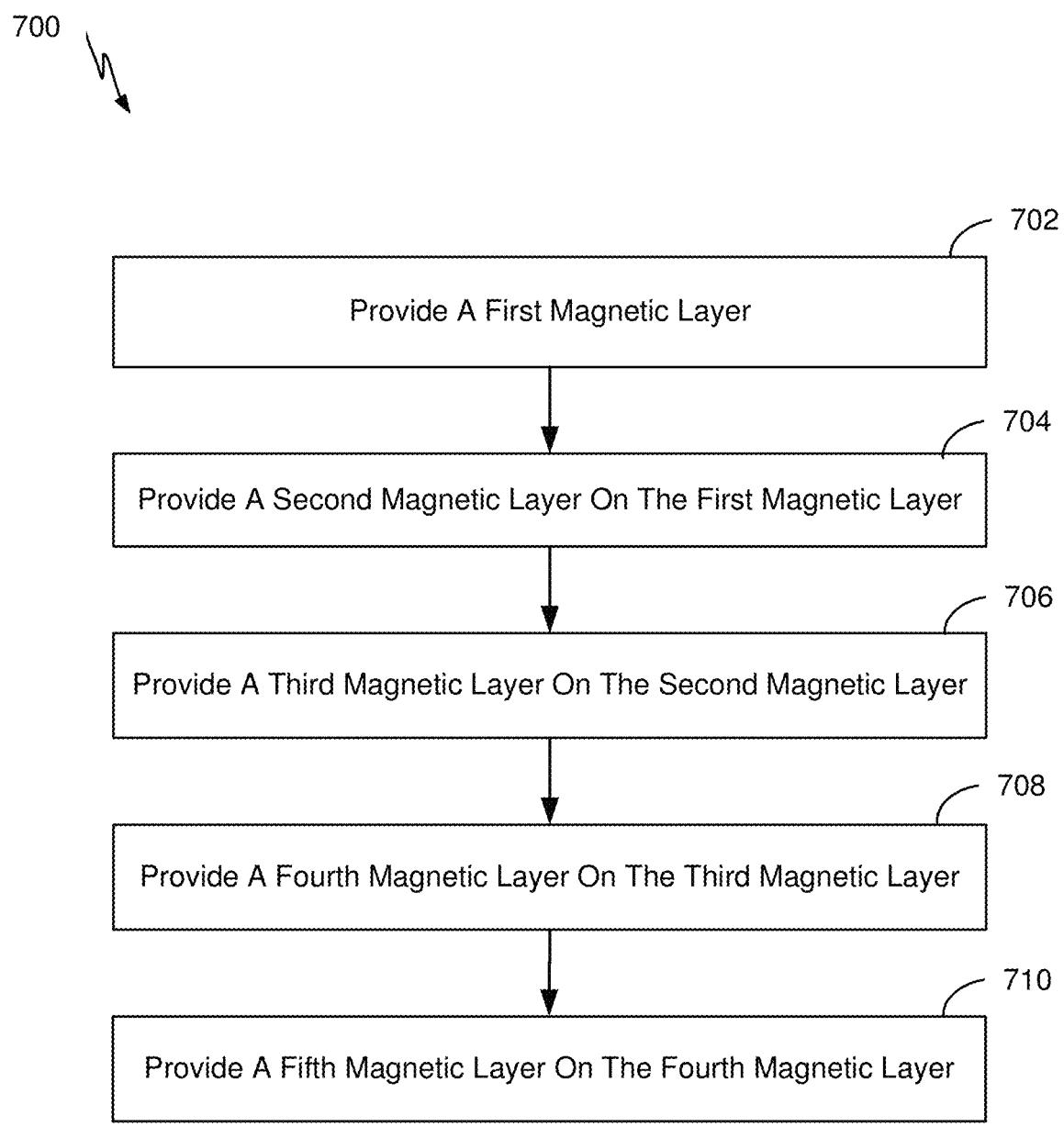
FIG. 7 is a flowchart of a process for fabricating a multi-layer magnetic recording layer in a HAMR medium in accordance with one aspect of the disclosure.

FIG. 7 is a flowchart of a process 700 for fabricating a multi-layer magnetic recording stack having amorphous magnetic segregants in accordance with one aspect of the disclosure. In one example, the process 700 may be used to fabricate the MRL in process 600. At block 702, the process provides a first magnetic recording layer on a substrate. In one embodiment, the first magnet recording layer may include first magnetic grains (e.g., FePtAg). At block 704, the process provides a second magnetic recording layer on the first magnetic recording layer. In one embodiment, the second magnet recording layer may include second magnetic grains (e.g., FePtAgCuC) that are different from the first magnetic grains. At block 706, the process provides a third magnetic recording layer on the second magnetic recording layer. In one embodiment, the third magnet recording layer may include third magnetic grains (e.g., FePtCBN) that are different from the first and second magnetic grains. At block 708, the process provides a fourth magnetic recording layer on the third magnetic recording layer. In one embodiment, the fourth magnet recording layer may include fourth magnetic grains (e.g., FePtSiO2BN) that are different from the first through third magnetic grains. At block 710, the process provides a fifth magnetic recording layer on the fourth magnetic recording layer. In one embodiment, the fifth magnet recording layer may include fifth magnetic grains (e.g., FePtSiO2BN) and amorphous magnetic segregants (e.g., Fe2B) that have a higher Curie temperature than the magnetic grains. In one embodiment, the process may provide the fifth magnetic recording layer without providing the fourth magnetic recording layer. In one embodiment, the process may provide the fourth magnetic recording layer without providing the fifth magnetic recording layer. In some embodiments, the second magnetic recording layer, third magnetic recording layer, and/or fourth magnetic recording layer may include amorphous magnetic segregants (e.g., Fe2B).

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

In one embodiment, the process can perform the sequence of actions in a different order. In another embodiment, the process can skip one or more of the actions. In other embodiments, one or more of the actions are performed simultaneously. In some embodiments, additional actions can be performed.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be formed by an apparatus controlled by hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable or machine readable medium having stored thereon computer executable instructions that when executed by a computer (e.g., a processor) control the computer to perform the functionality described herein. Examples of machine readable media suitable for implementing the subject matter described herein include non-transitory computer-readable media, such as disk memory devices, chip memory devices, programmable logic devices, and application specific integrated circuits. In addition, a machine readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

Certain components (including layers, coatings, or other components) listed herein may be described as "comprising," "made of," "including," or similar such terms, a material or a combination of materials. In one aspect, each of those components may also consist of that material or the combination of materials. In another aspect, each of those components may also consist essentially of that material or the combination of materials.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

If used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together. The term "about 'value X'", or "approximately value X", as used in the disclosure shall mean within 10 percent of the 'value X'. For example, a value of about 1 or approximately 1, would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure, various values (e.g., value X) may be specified, described and/or claimed. In one embodiment, it should be understood that the value X may be exactly equal to X. In one embodiment, it should be understood that the value X may be "about X," with the meaning noted above.

What is claimed is:

1. A magnetic recording medium for heat assisted magnetic recording, the medium comprising:
    a substrate;
    a heat sink layer on the substrate; and
    a magnetic recording layer on the heat sink layer and comprising:
        a plurality of magnetic recording grains configured for recording data and comprising a first magnetic alloy; and
        a plurality of segregants interleaved with the plurality of magnetic recording grains and comprising a second magnetic alloy, wherein a Curie temperature of the second magnetic alloy is higher than a Curie temperature of the first magnetic alloy, and
        wherein the second magnetic alloy comprises $Fe_2B$.

2. The magnetic recording medium of claim 1, wherein the first magnetic alloy of the plurality of magnetic recording grains comprises FePt.

3. The magnetic recording medium of claim 2, wherein the second magnetic alloy of the plurality of segregants comprises a compound selected from the group consisting of Fe2O3, Fe3O4, NiO-Fe2O3, and combinations thereof.

4. The magnetic recording medium of claim 2, wherein the magnetic recording layer further comprises a plurality of non-magnetic segregants selected from the group consisting of C, BN, oxide, and combinations thereof.

5. The magnetic recording medium of claim 1, wherein the Curie temperature of the second magnetic alloy is at least 200 Kelvin higher than the Curie temperature of the first magnetic alloy.

6. The magnetic recording medium of claim 1, wherein the magnetic recording layer comprises a plurality of magnetic layers, and at least one of the magnetic layers comprises the plurality of segregants.

7. The magnetic recording medium of claim 6, wherein the plurality of magnetic layers comprise:
a first magnetic layer comprising FePtAg magnetic grains;
a second magnetic layer comprising FePtAgCuC magnetic grains on the first magnetic layer;
a third magnetic layer comprising FePtCBN magnetic grains on the second magnetic layer; and
a fourth magnetic layer comprising FePtSiO2BN magnetic grains and the plurality of segregants, on the third magnetic layer.

8. The magnetic recording medium of claim 7, wherein the fourth magnetic layer comprises a first sublayer and a second sublayer on the first sublayer, and the second sublayer comprises a greater amount of the plurality of segregants than that of the first sublayer.

9. The magnetic recording medium of claim 6, wherein the plurality of magnetic layers comprise a first magnetic layer with the plurality of segregants, and the first magnetic layer has a greater thickness than other layers of the plurality of magnetic layers.

10. A data storage device comprising the magnetic recording medium of claim 1.

11. The data storage device of claim 10, further comprising a slider configured to record data to the magnetic recording medium.

12. A method for fabricating a magnetic recording medium for heat assisted magnetic recording, the method comprising:
providing a substrate;
providing a heat sink layer on the substrate; and
providing a magnetic recording layer on the heat sink layer, the magnetic recording layer comprising:
a plurality of magnetic recording grains configured for recording data and comprising a first magnetic alloy; and
a plurality of segregants interleaved with the plurality of magnetic recording grains and comprising a second magnetic alloy, wherein a Curie temperature of the second magnetic alloy is higher than a Curie temperature of the first magnetic alloy, and wherein the second magnetic alloy comprises Fe2B.

13. The method of claim 12, wherein the first magnetic alloy of the plurality of magnetic recording grains comprises FePt.

14. The method of claim 13, wherein the second magnetic alloy of the plurality of segregants comprises a compound selected from the group consisting of Fe2O3, Fe3O4, NiO-Fe2O3, and combinations thereof.

15. The method of claim 13, wherein the magnetic recording layer further comprises a plurality of non-magnetic segregants selected from the group consisting of C, BN, oxide, and combinations thereof.

16. The method of claim 12, wherein the Curie temperature of the second magnetic alloy is at least 200 Kelvin higher than the Curie temperature of the first magnetic alloy.

17. The method of claim 12, wherein the magnetic recording layer comprises a plurality of magnetic layers, and at least one of the magnetic layers comprises the plurality of segregants.

18. The method of claim 17, wherein the providing the plurality of magnetic layers comprise:
providing a first magnetic layer comprising FePtAg magnetic grains;
providing a second magnetic layer comprising FePtAgCuC magnetic grains on the first magnetic layer;
providing a third magnetic layer comprising FePtCBN magnetic grains on the second magnetic layer; and
providing a fourth magnetic layer comprising FePtSiO2BN magnetic grains and the plurality of segregants, on the third magnetic layer.

19. The method of claim 18, wherein providing the fourth magnetic layer comprises:
providing a first sublayer and a second sublayer on the first sublayer, the second sublayer comprising a larger amount of the plurality of segregants than that of the first sublayer.

20. The method of claim 17, wherein the plurality of magnetic layers comprise a first magnetic layer with the plurality of segregants, and the first magnetic layer has a greater thickness than other layers of the plurality of magnetic layers.

21. A magnetic recording medium for heat assisted magnetic recording, the medium comprising:
a substrate;
a heat sink layer on the substrate; and
a plurality of magnetic recording layers on the heat sink layer and comprising:
a first magnetic layer comprising FePtAg;
a second magnetic layer on the first magnetic layer and comprising FePtAgCuC;
a third magnetic layer on the second magnetic layer and comprising FePtCBN; and
a fourth magnetic layer on the third magnetic layer and comprising FePtSiO2BN, wherein the fourth magnetic layer comprises magnetic recording grains interleaved with magnetic segregants comprising a magnetic alloy different from a magnetic alloy of the magnetic recording grains.

* * * * *